Figures 1, 2, 3, 4A, 4B:
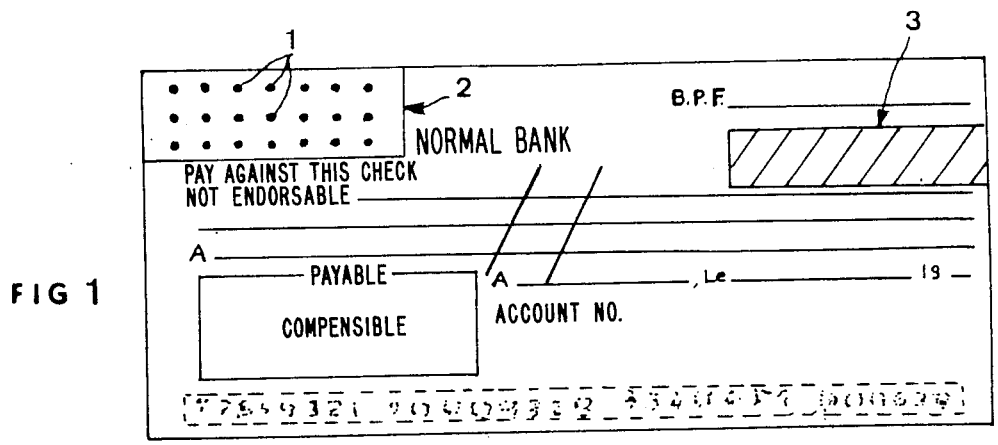

United States Patent [19]

Bonnaval-Lamothe et al.

[11] Patent Number: 4,774,513
[45] Date of Patent: Sep. 27, 1988

[54] PROCESS FOR CONTROLLING THE USE OF DOCUMENTS AND DOCUMENTS AND MEANS FOR IMPLEMENTING THIS PROCESS

[75] Inventors: Michel Bonnaval-Lamothe, Cadillac; Jean-Marie Grafeille, Bordeaux, both of France

[73] Assignee: Michel Bonnaval-Lamothe, France

[21] Appl. No.: 928,740

[22] Filed: Nov. 10, 1986

Related U.S. Application Data

[63] Continuation of Ser. No. 502,145, Jun. 8, 1983, abandoned.

[30] Foreign Application Priority Data

Jun. 8, 1982 [FR] France .................. 82 10161

[51] Int. Cl.$^4$ .................................... G06K 5/00
[52] U.S. Cl. .................. 340/825.340; 235/380; 283/59
[58] Field of Search ............ 340/825.34, 825.33, 340/825.31; 283/57–59, 69; 235/375–385

[56] References Cited

U.S. PATENT DOCUMENTS

| | | | |
|---|---|---|---|
| 3,702,392 | 9/1972 | St. Jean . | |
| 3,786,420 | 9/1974 | Stambler . | |
| 3,857,018 | 4/1974 | Stark et al. . | |
| 3,985,998 | 7/1976 | Crafton | 340/825.33 |
| 3,990,558 | 11/1976 | Ehrat | 340/825.34 |
| 4,016,404 | 10/1977 | Appleton . | |
| 4,020,536 | 6/1977 | Cuttill et al. | 361/311 |
| 4,023,013 | 5/1977 | Kinker | 340/825.34 |
| 4,179,686 | 12/1979 | Bonicalzi et al. | 340/825.34 |
| 4,303,852 | 12/1981 | Silverman et al. | 340/825.31 |
| 4,501,957 | 2/1985 | Perlman | 340/825.34 |
| 4,621,188 | 11/1986 | Stockburger et al. | 340/825.34 |
| 4,629,873 | 12/1986 | Stockburger et al. | 340/825.34 |

FOREIGN PATENT DOCUMENTS 2133941 4/1972 France .
2441222 3/1980 France .

Primary Examiner—Donald J. Yusko
Attorney, Agent, or Firm—Robert J. Koch

[57] ABSTRACT

A process controlling the use of a document reserved to the titleholder along or to the authorized bearer, and is characterized by consisting prior to the activation of the document in integrating into a predetermined zone of the document a predetermined and random coded transcription of a set of letters and/or digits constituting a secret "word" known only to the titleholder, the coded data being spread across a matrix of n rows and p columns, in comparing at the time the document is used the coded data with a "word" issued by the document bearer following the transcription in the same code, and in determining and displaying whether in there is coincidence or not.

The process applies in particular to checks or the like. The invention also relates to the documents and the coding and reading means designed or developed to implement this process.

4 Claims, 4 Drawing Sheets

```
                        binary code
                    D   C   B   A
alphabet weight →   8   4   2   1

A              0   0   0   0
     E              0   0   0   1
     I              0   0   1   0
     O              0   0   1   1
     U              0   1   0   0
     Y              0   1   0   1
  B ou Q            0   1   1   0
  C  "  Z           0   1   1   1
  D  "  N           1   0   0   0
  F  "  S           1   0   0   1
  G  "  P           1   0   1   0
  H  "  W           1   0   1   1
  J  "  V           1   1   0   0
  K  "  T           1   1   0   1
  L  "  R           1   1   1   0
  M  "  X           1   1   1   1
```

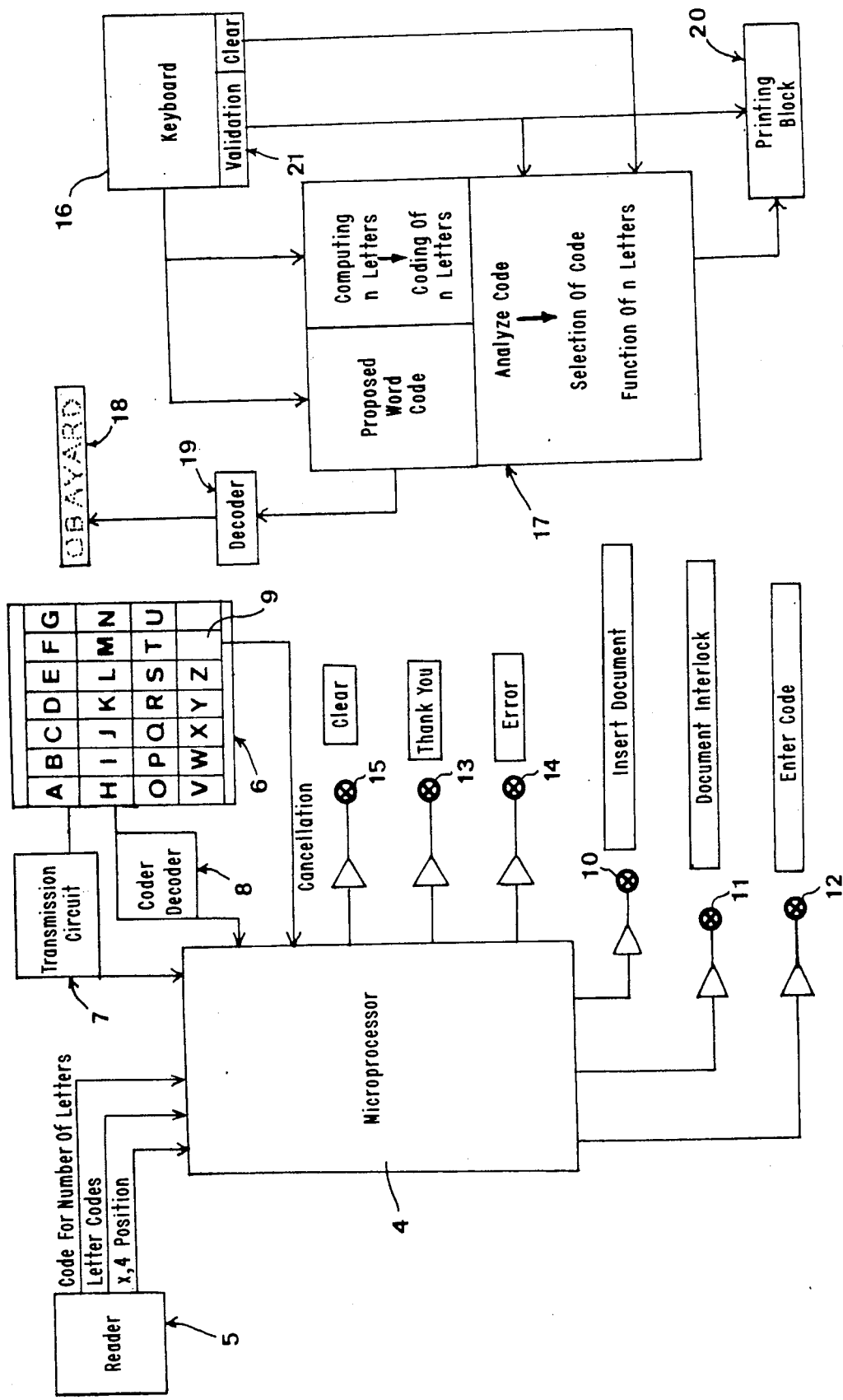

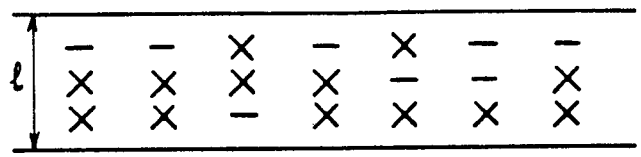
FIG_7_
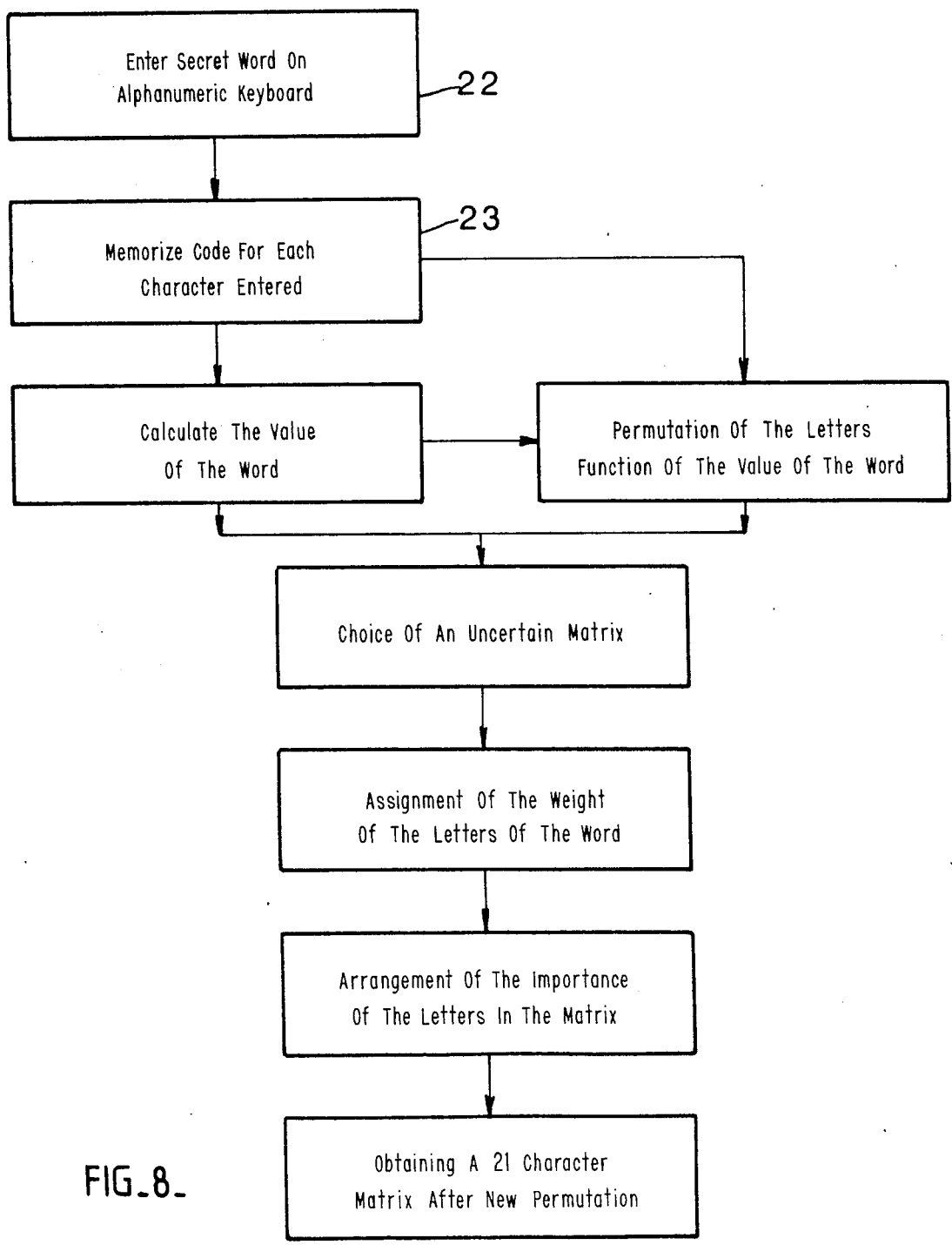
FIG_8_

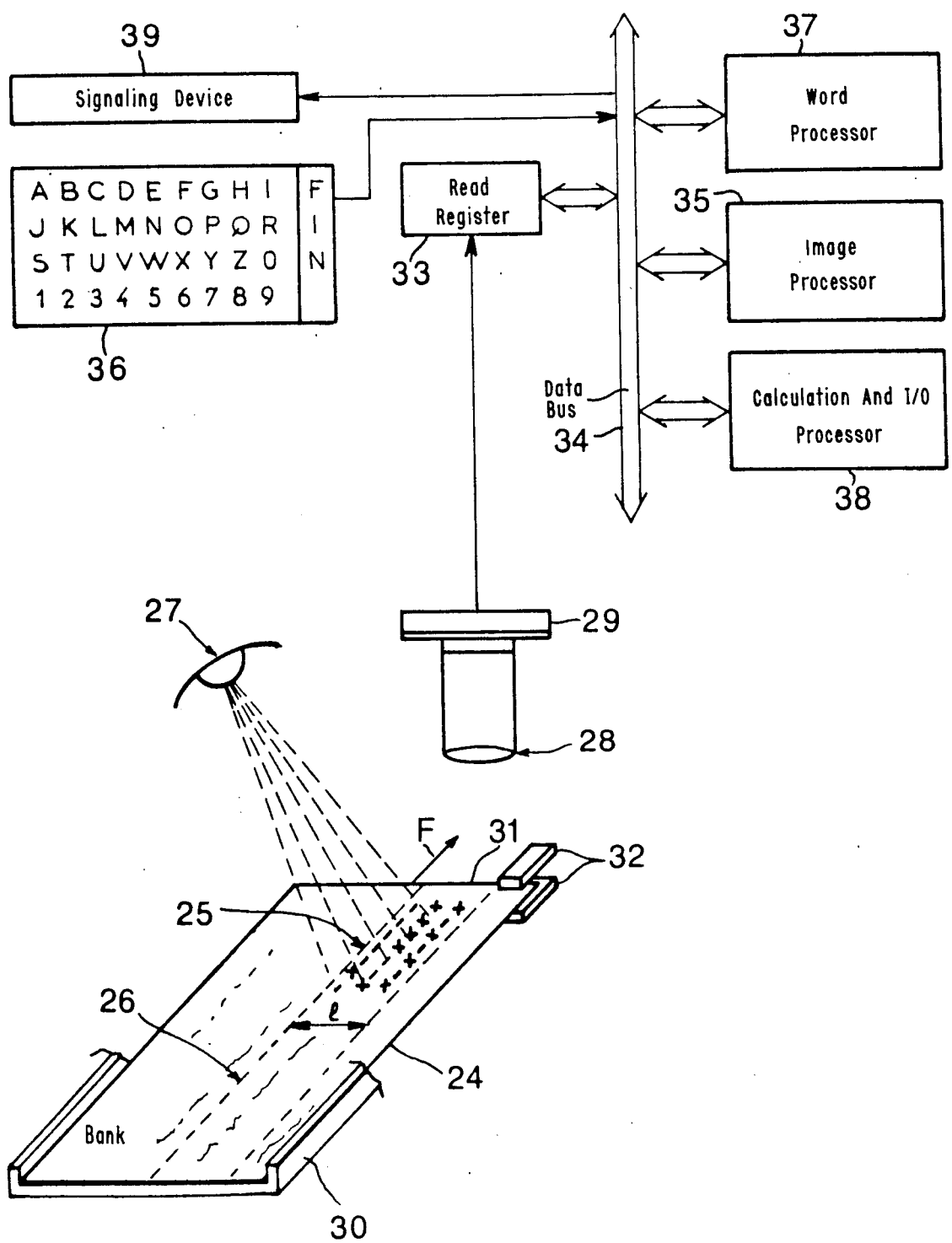
FIG_9_

PROCESS FOR CONTROLLING THE USE OF DOCUMENTS AND DOCUMENTS AND MEANS FOR IMPLEMENTING THIS PROCESS

This application is a continuation application Ser. No. 502,145, filed June 8, 1983, abandoned.

The present invention concerns controlling the use of reserved documents and in particular verifying that the bearer of the reserved document actually is the genuine title-holder of this document or a person entitled to use it.

The term "reserved document" herein means any tangible medium consisting of an arbitrary material representing a purchasing power, a currency value, a credit, an arbitrary predetermined authorization, and even though the invention applies quite particularly to the field of money or banking, it obviously also covers any similar application in other areas where such documents might be used in the broad sense defined above.

Such controls on the use of documents of this kind are already in use presently.

Illustratively and remaining in the money and banking fields, certain credit cards or cards for withdrawing bank notes from suitable paying machines can be cited.

These documents generally are plastic cards and coded magnetically with four digits, that is, to each digit or combination of digits, there corresponds on this card, within a predetermined zone, a specific and unique distribution of discrete magnetic elements arranged according to a corresponding law or key which obviously is kept secret by the designer of the card.

While it is relatively difficult to crack this coding mode, the mode nevertheless entails several drawbacks.

As regards the user, he is observed to have some difficulty in memorizing four digits without any particular significance, so that frequently he will clearly write the code of his card on a medium as a rule close to the card in the same card-holder or wallet, or even on the card itself. This explains the numerous frauds committed by means of stolen cards.

Furthermore, and though relatively difficult to crack, a four-digit magnetic coding is not absolutely safe against sufficient effort using present-day computational means and patience. However, the protection against cracking cannot be extended because a four-digit code, for the reasons cited above, appears to be the limit of memorization that can be expected from the typical user.

As regards the issuer and card manufacturer, this type of coding is relatively expensive and unquestionably it cannot be applied to media of ephemeral and virtually zero intrinsic value, that is, to be used only once and then be destroyed or discarded.

The object of the present invention is to apply the use-control of certain documents to fields hitherto beyond application but where nevertheless the need for such a control shows up ever more mandatorily, and very particularly to the field of bank checks or the like.

To that end, the object of the invention is a process for controlling the use of a document reserved to the very title-holder or to the authorized bearer, characterized in that it consists, prior to the document being presented, in integrating into a predetermined zone of the document a randomly and predeterminedly coded transcription of a set of letters and/or digits constituting a secret "word" known only by the single title-holder, the coded data being arrayed in a matrix of n rows and p columns, and in comparing at the very time of presenting the document the coded data with a "word" issued by the document bearer following transcription in the same code, and in determining and displaying the presence or absence of coincidence.

"To present" in this context means to attempt to conduct a transaction by authority of or with the aid of the reserved document, and includes but is not limited to the meaning of the term "to present" in the law of commercial paper.

The employment of such coding introduces near absolute security because among other factors it is possible to make use of words of more than four letters which will be advantageously composed by the future title-holders before the fabrication of their document and which therefore will be selected in such a manner that they can be easily memorized, the employment of the letters, a larger number of coded signs (six, seven, eight or more), and also the random coding creating absolutely deterring factors against reconstituting the coded data by combination analysis in the absence of knowing the code elements.

Moreover such a coding can be tangibly implemented in an extremely simple, rapid and economical manner by means of a matrix consisting of a network in a document comprising a given number elementary regions or parts containing binary information, that is the states 0 or 1.

Thus another object of the invention is a document comprising such a code within a predetermined zone, where this code consists in one implementation of a regular array including or not a printed pattern, this array corresponding to the coding matrix and the presence or absence of this said printed pattern at each intersection of the matrix representing one binary datum corresponding to the selected word.

Accordingly the very particular application of the invention to bank checks or the like can be undertaken in a clear manner, which is simple and economical, and which should slow and reduce radically the extraordinary rise in stolen-check swindles which are presently extant.

Furthermore the invention includes a means for implementing said control process, this means being characterized by comprising a comparator-decoder microprocessor connected on one hand to a reader for the document zone and on the other hand to an alphabetic or alphanumeric keyboard through a binary coder-decoder and displays of instructions and of information relating to the control-read mechanism.

Accordingly the process of the invention is implemented on one hand as regards banking by issuing checks strictly adhering to legal standards but bearing a coded word known only to the checkbook's titleholder, and on the other hand by installing, especially at the merchant's, at the windows of offices, government buildings, etc. control devices of the invention allow verification of whether the bearer of the presented check is in fact the checkbook titleholder or at least a person knowing the word and entitled (or considered to be entitled) to use said check. Automatically or upon request by the merchant or employee, the check bearer would be asked to submit to such a control by inserting his check into the device and typing the coded word he is expected to know on the keyboard in the manner presently employed for the credit cards used in withdrawing cash.

Lastly, in order to further enhance the security of such a system, it is still another object of the invention to provide a coding means which assures total discretion when the words selected by the user are being transcribed, in particular as regards the checkbook users, such a device transcribing the selected word into a coding matrix exactly reproducing said array which must be on the document. Such a wholly undecipherable matrix accordingly may be safely in circulation, offering total security during the later fabrication of the coded document of the invention.

Other features and advantages of the invention will be discussed and made clear in the description below of an implementation mode, this description being provided in solely illustrative manner and with respect to the attached drawings.

FIG. 1 illustrates a check coded in conformity with the invention,

FIG. 2 illustrates a hexadecimal code which can be used in implementing the process of the invention, FIG. 3 illustrates a bit array on the coding matrix, FIGS. 4a and 4b show two coding examples for two different names, FIG. 5 is a block-diagram of a control-reader for documents of this invention, FIG. 6 is a block-diagram of a coder of the invention, FIG. 7 is a coded matrix for another implementation of the invention, FIG. 8 is a flow-chart for determining a matrix coded per FIG. 7, FIG. 9 schematically shows the structure of a reader of the invention and designed to read the matrices of FIG. 7.

FIG. 1 shows a standard bank check as used in France provided with a code of the invention visually apparent as an alignment of black dots 1 grouped in a well-defined zone 2 of the check.

This zone 2 is located in the upper left area of the check and together with a possible zone 3 in the upper right forms the two places on the front where by present standards a coding is preferred for a standard French check; this coding however might also be put on the back.

Adaptation to standard check formats such as those prevalent in the United States will be readily apparent to one of ordinary skill in the art.

The dots 1 are regularly arrayed in a three-row matrix with seven dots each, which define the coding sites, that is the sites holding binary data, for instance the presence or absence of a small black printed disk which can be easily detected by photoelectric means. It is evident that any other binary representation may be substituted for the printed or absent disks, for instance the presence or absence of perforations, of a discrete magnetic medium, etc., the means for reading this code clearly being designed accordingly and operating photoelectrically, magnetically, electrically, by physical contact, etc.

The material and the shape of the disks or dots 1 are also understood to vary widely.

In actuality, only some of the disks 1 will be contained in one or another manner on the check, as shown for instance in FIGS. 4a, 4b, depending on the coded name.

In the implementation shown on the drawings, the basis is the hexadecimal code wherein the 26 letters of the alphabet are rearranged as needed into 16 characters (ten pairs of letters having the same binary representation), one binary representation on the four binary weights 8,4,2,1.

It was seen above that the coding matrix being used comprises twenty-one bit sites. Sixteen of these sites are used for hexadecimal coding according to the array of FIG. 2, while three sites are used to define the number of letters in the coded word, also the location of the coded letters of the selected word, and lastly, the last two sites are used to position the check in the control-read device (along two rectangular reference axes).

FIG. 3 illustratively shows a spreading mode of the three types of locations cited above on the twenty-one bit coding matrix.

The sixteen locations for hexidecimal coding allow coding four letters of which the order is indexed by one of the letters DCBA.

As illustrated in FIG. 3, the first coded letter of the selected word will have as the binary weight 1 the site $D_1$ with a value 0 or 1 depending on this particular letter having a value 0 or 1 at weight 1 depending on the array of FIG. 2. For the binary weight 2, it will have the site $D_2$ with a value of 0 or 1 and so on for the weights 4 and 8. The second coded letter will be assigned to the sites $C_1$, $C_2$, $C_4$ and $C_8$ and the third and last letters will be assigned to the sites $B_1$, $B_2$, $B_4$, $B_8$ and $A_1$, $A_2$, $A_4$ and $A_8$ respectively.

The locations of the letters of the selected word and which are to be coded are determined by a random code whereby a binary value will correspond to the number of letters of the selected word, this binary value being of three weights and inserted into the three sites $n_1$, $n_2$, $n_3$. The selection of this code allows determining for each selected word (between 4 and 11 letters) the site (or the rank) of the four letters which are kept in this word so they may be coded.

The selection of this code, of the sites of the bits in the matrix and of the corresponding array of the hexadecimal code assure near-absolute security against any attempt to find the coded name unless the coding keys and arrays be known.

The last two sites X and Y determined on the matrix of FIG. 1 correspond to the position of the check.

FIGS. 4a and 4b illustrate the coded transcription as it might appear in the check zone 2, namely of two words, in this instance two first names, Christiane (FIG. 4a) and Michel (FIG. 4b).

As regards Christiane, the coded letters for instance are the 3rd, 5th, 7th and 10th, namely the letters R,S,I and E, and this is translated by the following matrix by using the code of FIG. 2:

| $D_8$ | $D_4$ | $D_2$ | $D_1$ | $C_8$ | $C_4$ | $C_2$ | $C_1$ | $B_8$ | $B_4$ | $B_2$ | $B_1$ | $A_8$ | $A_4$ | $A_2$ | $A_1$ | $n_3$ | $n_2$ | $n_1$ |
|---|---|---|---|---|---|---|---|---|---|---|---|---|---|---|---|---|---|---|
| 1 | 1 | 1 | 0 | 1 | 0 | 0 | 1 | 0 | 0 | 1 | 0 | 0 | 0 | 0 | 1 | 1 | 1 | 0 |

Unless the nature of the codes be known, the coded representation such as appearing on FIGS. 4a, 4b is strictly undecipherable.

Considering the simplicity and very low cost of integrating such coded words onto an arbitrary medium, many applications are open, and most of all for documents such as checks or bank, postal, currency, financial documents or the like which are used only once.

The implantation or application of a code such as those of FIGS. 4a and 4b actually can be carried out by directly printing the transcriptions on checks or the like, even simultaneously with the printing of the checks.

Due to the process of the invention, the titleholder of the bank account can code his checkbooks with a name he can easily remember and which he will relate in confidence to his banker and without which his checks will not be useful to third parties. Obviously too this name can be suggested or made mandatory by the banker.

Because the coding is made personal and easy to remember, the titleholder no longer will be tempted to write down any part of his code lest he forget it, as was the case already cited above in relation to withdrawing currency.

However, the largest significance of such a system is the nearly total security provided to the person receiving payment by such a check to the extent—of course—he will verify the authority of the check bearer to use the said check.

To that end, the invention also concerns a device capable of controlling such documents by reading, and being schematically shown by a block diagram in FIG. 5.

This FIG. 5 shows a microprocessor 4 with 8 comparison-decoding bits and connected on one hand to a reader 5 for reading the 21 sites coding the zone 2 of the check in accordance with the invention, and on the other hand to an alphabetic keyboard 6 whereby the bearer of the check enters data.

The reader 5 provides data relative to the three types of coded bits cited above.

The keyboard 6 is connected to the microprocessor 4 through a series transmission circuit 7 and a coder-decoder 8 (sixteen bits, binary decimal code). Furthermore the keyboard 6 comprises a clear key 9 connected to the microprocessor 4.

The microprocessor 4 delivers a certain number of indications or instruction signals displayed for instance by pilot lights.

The operation is as follows: When the lamp 10 (INSERT DOCUMENT) is lit (device "on"), the document bearer inserts the document into a slot or housing provided for that purpose in the device. If operation is proper, the document is locked, this operation being indicated by the light 11.

The reader 5 transmits the read code to the microprocessor 4, while lamp 12 is lit and ask the bearer of the document to type in his code, which he does by introducing through the keyboard 6 the entire word relating to the document and which he is supposed to know.

It should be noted that due to multiplexing of the bits addressed in series by the circuit 7 to the microprocessor 4, the device is tamper proof. In case of theft there is no way to crack the features of the utilized coding (FIG. 2) because the latter utilizes complex-function circuits lacking any test points.

The transmittal of the inserted code and its comparison in the microprocessor 4 with the read code cause the lamp 13 to light (THANK YOU) if there is coincidence or otherwise the lamp 14 (ERROR).

An auxiliary lamp 15 lights in case of clearing or interruption in the code insertion mechanism by the document bearer.

If the coincidence lamp 13 lights up, then in all probability the bearer is the document titleholder or at least a person duly authorized to use the titleholder's document.

Such a process and such control means can well be made general with a large number of persons or entities which routinely receive many checks or the like in settlement, for instance merchants, bankers, counter-employees at private or public offices etc., and by their nature substantially reduce the use of stolen checks.

This is so because the possessor of a stolen check who might be tempted to present it for payment would be at once recognized by being asked at the time of settlement to move his check into the control-read device of the invention.

The check issuers (the bankers), the account titleholder, and the beneficiaries in varying respects therefore would be assured and totally secure if such a system were widespread. The bankers no longer would have to honor stolen checks, the titleholder in case of loss or theft of his check would be assured his account would not be billed for it unduly, and the beneficiaries would be assured not being paid with stolen checks.

Furthermore such a system if widespread in the end would make practically useless the theft of checkbooks since the thief could not particularly use them, and the theft of checkbooks accordingly would decrease.

In order to further enhance the security, the invention lastly concerns a coder providing absolute confidentiality when transcribing a name selected by a user for his checkbooks.

FIG. 6 illustrates a block-diagram of such a device. Its purpose is to allow the user to directly type on an arbitrary medium the matrix such as shown in FIGS. 4a and 4b from a name he has selected without a third partygaining knowledge in clear form of the coded name.

This latter device comprises an alphabetic keyboard 16 connected to a microprocessor 17 itself connected to a display 18 through a decoder 19 and a printing block (or other equivalent system) 20.

The microprocessor 17 ensures coding the selected word which is inserted through the keyboard 16, this coding being retranscribed in clear and displayed at 18 so it can be checked.

This coding is performed by the procedure defined above and depending on the coding features retained and inserted into the microprocessor by its designer.

Once the properly selected word is inserted and coded and checked at 18, a validation key 21 initiates the printing by the block 20 of a dot matrix such as shown in FIGS. 4a, 4b on a arbitrary card medium.

Thereupon this card medium together with the identifying elements from the device's user will be transmitted to a printer containing the checks, each of which will receive by printing simultaneously with the check said matrix appearing on the card medium precisely the way it appears.

Illustratively the device is installed at the banker's where the account titleholder himself will type in—shielded from looks of scrutiny—his personal code known only to him since the banker and the printing personnel will only know the totally undecipherable coded matrix.

In a variation of the process of the invention, one (or several word(s)) possibly related to a number will be integrated into a predetermined zone of the check by transcribing said word or set of letters and digits into a matrix consisting of a random distribution of a specific number of signs or characters.

FIG. 7 illustrates an example of such a matrix consisting of three rows and seven columns. At the intersection between each row and column, there is a sign (in this instance a short line or a cross). The distribution of these signs in the matrix is wholly incomprehensible to those who do not know the code being used.

The matrix shown in FIG. 7 comprises 21 sites such as those of FIGS. 3, 4a and 4b; however, contrary to the case for the latter ones, the information content of the matrix is not a sequence of binary values consisting of the presence or absence of a data medium element, but of a series of signs of two different shapes each rendering a binary state.

FIG. 8 is a flow-chart illustrating the transcription-coding principle implemented by the invention.

Using an alphanumeric keyboard 22, the selected secret word is typed in. The expression "word" means a set of letters with or without sense and to which may be assigned digits.

The keyboard 22 is connected to a memory register 23 following the coding of each letter or digit.

The random matrix is selected from the register 23 by computation of the value of the typed-in word and by permutation of the letters (or digits) as a function of the value of the word.

Weights are assigned to the various letters (or digits) of the word in this matrix. Then these weights are arranged in the matrix and after new permutations a matrix is obtained, for instance of 21 characters, as shown for the matrix of FIG. 7.

The total of these operations is carried out by a system of the kind shown in FIG. 6, that is by an alphanumeric keyboard 22 connected to a microprocessor, to a printing block (such as 20) and to a display means (such as 18).

The microprocessor is designed to perform the suitable coding, permutating, and weighting operations. There is a practically infinite number of secure coding modes.

FIG. 2 illustrates a possible coding mode.

The coded matrix of FIG. 7 (which obviously is a non-limiting example) is particularly well suited in applying the invention to checks.

This matrix can be perfectly well integrated into the present-day check-printing procedure.

This procedure takes place in three stages. In the first stage, the check background of the particular bank is printed. This background consists of elements which are common to all clients.

In a second stage, more personal data of the check are printed, namely the name of the bank agency and its code, telephone number, client account number, name and address of client and check number.

The third stage is in printing the code of bars consisting of inter-bank codes and of the own internal codes of the banks.

These three printing sequences apply to three well defined zones of the check.

The matrix of FIG. 7 can be perfectly integrated into the procedure of the second printing stage (personal data).

Because the checks are printed with rapid printers equipped with a set of signs and alphanumeric characters, the matrix of FIG. 7 can be printed by means of these rapid printers during said second stage and without any loss of time. As a matter of fact the printing of the personal data takes place over at least three printing lines and only takes up a fraction of the zone assigned to that printing. It is possible in the remainder of that zone to have the rapid printer print the signs of the coded matrix without loss of time because the printing heads systematically sweep all the lines of the printing zone being discussed and over their entire lengths regardless of the size of the conventional personal data.

The matrix of FIG. 7 is easily integrated into the data medium supplied by the bank to the printer and holding all the necessary information to print the checks completely.

Once the matrix of FIG. 7 appears on the checks, it will be read by a reading means schematically indicated in FIG. 9 and located (just as the reader of FIG. 5), with any entity or person receiving checks in settlement.

FIG. 9 shows a check 24 coded according to the invention and, in a zone 25 of width 1 extending over three printing lines (following the zone 26 reserved to personal data), a coded matrix such as that of FIG. 7.

The coded zone 25 is illuminated by a symbolic device 27 mounted on the reader. An optics 28 projecting the image of the coded matrix onto a charge-transfer photosensitive device 29 is mounted above the coded zone.

The system 28–29 dynamically analyzes the coded zone. For that purpose the check 24 is placed on a mobile carriage schematically shown as 30, supported by the reader and capable of moving (manually or automatically) underneath the system 28–29.

Read-out is controlled automatically the moment after moving the carriage 30 in the direction of arrow F the leading edge 31 moves into the axis of the system 28–29, this transit being detected by device 32 which may be a photoelectric cell or the like.

The 21 characters of the coded matrix are sequentially read by the device 32. This device 32 is of a known type comprising 1728 or 1024 photodiodes (depending on model) and "reads" the accumulated charges of these photoelements. The dimension of each photodiode is 13 microns by 13 microns and the system resolution is 38 pel/mm. Each photodiode is provided with a capacitor accumulating the electrons generated by the light, so that accumulated charges proportional to the illumination and to the time of integration are obtained. A black reference is included in the device.

The levels stored in the capacitors are sequentially transferred into a read register 33 which will be discharged through a multibus 34 into an image processor 35.

After the coded zone has been swept underneath the system 28–29, the image will be stored in the processor 35.

Furthermore the check user types his secret word on an alphanumeric keyboard 36. A word processor 37 connected to the multibus 34 carries out a coded transcription of this word by the same procedure in coding as was used for encoding (FIG. 8). A dialog and computation processor 38 connected to the multibus 34 "reads" the two processors 35 and 37, compares them and indicates coincidence or absence of it between the coded matrix on the check and that developed by the processor 37 from the word inserted by the user. A signalling display 39 displays the various data required for the procedure (in particular the display of the word typed on the keyboard 36 and the result of this comparison).

In fact such read-out of the coded matrix is an acknowledgment of two distinct shapes, whereby the system acquires better security than from the detection of the presence or absence of bits.

This is so because it is much more difficult to imitate or forge specific shapes, the more so that the check safety paper prevents any erasure.

The expression "shape" means a succession of dots or short strokes which are connected between them or not and determine a letter, a digit or an arbitrary sign. It is particularly to the point to use two of the signs already available in the present-day rapid printers, however the invention also allows adapting to other shapes, for instance specific dot distributions which can be read by the system 28-29, where these dots can be printed in the zone 26 of the check that contains the personal data, or better yet, these dots may constitute all or part of the characters (letters, digits or signs) for printing said personal data, the latter case being applicable to needle printers.

The ink used to print the coded matrix of course is that used for the other printed data in the check zone for personal information, because it is not absolutely necessary to use a special ink (magnetic, luminescent etc.).

The components 28 through 39 are put into a compact unit and form the reader.

It should be noted that the invention applies to all kinds of reserved documents. The expression "reserved document" applies to any medium, whether rigid or not, made of an arbitrary material, with arbitrary dimensions and shapes, whether for single or repeated use, and capable of receiving coded data reserved to the sole titleholder of the document and representing purchasing power, an exchange power, a monetary value, a credit, or a predetermined authorization of any kind, etc., the invention therefore widely transcending the mere boundaries of controlling check use.

Lastly, the invention obviously is not restricted to the implementing modes shown and described hereabove but on the contrary covers all variations, in particular as regards the coding modes, the means for representing the coded informations on the document and the technological means to perform the comparison between the code read off the document and the code held by the document bearer.

We claim:

1. A method of verifying at presentation of a bearer's authority to use a reserve document comprising:
    the steps prior to presentation of the document of:
        a bearer selecting a password comprising a plurality of alphanumeric characters and entering said password into a keyboard;
        generating a coded transcription of said selected password in the form of a first matrix pattern of indicia on a support;
        imprinting the document with said matrix pattern in a predetermined area;
    and the steps at presentation of the document of:
        reading the matrix pattern imprinted on said document;
        entering of the password by a bearer;
        reading the password in a digital form;
        generating a first coded transcription of said inputted password by encoding said bearer inputted password and a second coded transcription of said matrix pattern from said matrix reading step;
        comparing said first coded transcription with said second coded transcription in a digital form; and
        issuing an authorization signal upon coincidence of said first and second coded transcription.

2. A method as claimed in claim 1 wherein the matrix pattern has rows and columns defining indicia positions, and wherein each position is imprinted with one of two different symbols during an initial printing of the document.

3. A method as claimed in claim 1 wherein the imprinting of said matrix pattern on the document is performed when printing personal data, along printing lines assigned to said personal data, by a common printing head.

4. A method as claimed in claim 2 wherein the imprinting of said matrix pattern on the document is performed when printing personal data, along printing lines assigned to said personal data, by a common printing head.

* * * * *